(12) United States Patent
Fitts et al.

(10) Patent No.: US 11,425,138 B2
(45) Date of Patent: *Aug. 23, 2022

(54) NETWORKING APPLICATION FOR CONTROLLED-ACCESS-ESTABLISHMENT

(71) Applicant: TNB Growth Corporation, Dallas, TX (US)

(72) Inventors: J. Stuart Fitts, Dallas, TX (US); Phillip J. Romano, Dallas, TX (US)

(73) Assignee: TNB Growth Corporation, Dallas, TX (US)

(*) Notice: Subject to any disclaimer, the term of this patent is extended or adjusted under 35 U.S.C. 154(b) by 89 days.

This patent is subject to a terminal disclaimer.

(21) Appl. No.: 16/787,941

(22) Filed: Feb. 11, 2020

(65) Prior Publication Data

US 2020/0177601 A1 Jun. 4, 2020

Related U.S. Application Data

(63) Continuation of application No. 15/710,786, filed on Sep. 20, 2017, now Pat. No. 10,587,624.

(Continued)

(51) Int. Cl.
*G06F 21/31* (2013.01)
*G06F 21/44* (2013.01)
(Continued)

(52) U.S. Cl.
CPC ............ *H04L 63/104* (2013.01); *G06F 21/31* (2013.01); *G06F 21/40* (2013.01); *G06F 21/41* (2013.01);
(Continued)

(58) Field of Classification Search
CPC . H04L 63/104; H04L 63/0876; H04L 63/102; H04L 67/303; H04L 67/306;
(Continued)

(56) References Cited

U.S. PATENT DOCUMENTS 8,498,900 B1 7/2013 Spirin et al.
8,880,101 B2 11/2014 Fraccaroli
(Continued)

OTHER PUBLICATIONS

Foreign Communication from Related Counterpart Application; PCT Patent Application No. PCT/US17/52590 International Search Report and Written Opinion of the International Searching Authority dated Jan. 18, 2018; 7 pages.

*Primary Examiner* — Techane Gergiso

(57) ABSTRACT

This disclosure provides an apparatus, method, and non-transitory computer readable medium for operating networking for members and supporting a controlled-access establishment. The apparatus includes a memory and a processor couple to the memory. The memory stores a plurality of member profiles corresponding to a plurality of member devices including a first member profile corresponding to a first member device, where each member profile contains information about a member related to the member a member device. The processor receives a new member application related to a second member device not included in the plurality of member profiles; determines member attributes of the second member profile based on the received new member application related to the second member device; generates a networking recommendation based on the member attributes, recommendation information, recommendation trigger information, and recommendation target information; and transmits the networking recommendation to the first member device.

21 Claims, 9 Drawing Sheets

Related U.S. Application Data

(60) Provisional application No. 62/397,278, filed on Sep. 20, 2016.

(51) Int. Cl.
| | | |
|---|---|---|
| *G06Q 30/06* | (2012.01) | |
| *G06Q 50/00* | (2012.01) | |
| *G06F 21/40* | (2013.01) | |
| *G06F 21/41* | (2013.01) | |
| *H04L 67/303* | (2022.01) | |
| *H04L 67/306* | (2022.01) | |
| *H04L 9/40* | (2022.01) | |

(52) U.S. Cl.
CPC ......... *G06F 21/44* (2013.01); *G06Q 30/0631* (2013.01); *G06Q 50/01* (2013.01); *H04L 63/0876* (2013.01); *H04L 63/102* (2013.01); *H04L 67/303* (2013.01); *H04L 67/306* (2013.01); *H04L 63/08* (2013.01)

(58) Field of Classification Search
CPC ......... H04L 63/08; G06F 21/31; G06F 21/40; G06F 21/41; G06F 21/44; G06Q 30/0631; G06Q 50/01
See application file for complete search history.

(56) References Cited

U.S. PATENT DOCUMENTS

| | | | |
|---|---|---|---|
| 9,264,874 B2 | 2/2016 | Fraccaroli | |
| 9,948,359 B2* | 4/2018 | Horton | H04B 5/0056 |
| 10,244,478 B2* | 3/2019 | Kincaid | G07C 9/00174 |
| 2002/0087410 A1* | 7/2002 | Walker | G06Q 30/0238 705/14.36 |
| 2002/0093425 A1* | 7/2002 | Puchek | G07C 9/37 340/540 |
| 2002/0168992 A1 | 11/2002 | Eiden et al. | |
| 2006/0047725 A1 | 3/2006 | Bramson | |
| 2008/0032719 A1* | 2/2008 | Rosenberg | G06Q 30/02 455/466 |
| 2008/0306826 A1* | 12/2008 | Kramer | G06Q 30/0212 705/14.14 |
| 2010/0293855 A1* | 11/2010 | Bolduc | E06B 11/085 49/31 |
| 2011/0145049 A1* | 6/2011 | Hertel | G06Q 20/325 705/14.23 |
| 2012/0069131 A1 | 3/2012 | Abelow | |
| 2013/0257617 A1* | 10/2013 | Alicot | G08B 13/2482 340/572.1 |
| 2014/0195549 A1 | 7/2014 | Ahn et al. | |
| 2014/0214946 A1 | 7/2014 | van de Bruggen | |
| 2014/0279644 A1 | 9/2014 | McCrory et al. | |
| 2015/0095121 A1 | 4/2015 | Bastian et al. | |
| 2015/0099550 A1 | 4/2015 | Alharayeri | |
| 2015/0294515 A1* | 10/2015 | Bergdale | H04W 4/80 340/5.61 |
| 2016/0055689 A1* | 2/2016 | Raina | G07C 9/15 340/5.7 |
| 2016/0088546 A1* | 3/2016 | Birch | H04W 4/021 455/456.3 |
| 2016/0307158 A1 | 10/2016 | Tang et al. | |
| 2017/0236232 A1* | 8/2017 | Morton | G06Q 50/265 705/325 |
| 2017/0294089 A1* | 10/2017 | Miwa | G08B 25/005 |
| 2017/0323209 A1 | 11/2017 | Rinzler et al. | |

\* cited by examiner

NETWORKING APPLICATION FOR CONTROLLED-ACCESS-ESTABLISHMENT

CROSS-REFERENCE TO RELATED APPLICATIONS

This application is a continuation of U.S. patent application Ser. No. 15/710,786, filed Sep. 20, 2017, which claims the benefit of the filing date of U.S. Provisional Patent Application No. 62/397,278 entitled "NETWORK APPLICATION FOR CONTROLLED-ACCESS-ESTABLISHMENT" filed Sep. 20, 2016, the content of which is hereby incorporated by reference.

TECHNICAL FIELD

The present application relates generally to controlled-access establishments and, more specifically, to a networking application for controlled-access establishments.

BACKGROUND

Networking is an important factor to people in different industries. A person looking to make new contacts might not find any current methods meaningful or helpful. Offering features and amenities for networking that are exclusive to the establishment will enhance the ability for customers or members to network.

SUMMARY

This disclosure provides a networking apparatus supporting members-only establishments and related methods.

In a first embodiment, an apparatus operating a networking application is provided. The apparatus includes a memory and a processor coupled to the memory. The memory stores a plurality of member profiles corresponding to a plurality of member devices including a first member profile corresponding to a first member device, where each member profile contains information about a member related to the member device. The processor receives a new member application related to a second member device not included in the plurality of member profiles; determines member attributes of the second member profile based on the received new member application related to the second member device; generates a networking recommendation based on the member attributes, recommendation information, recommendation trigger information, and recommendation target information; and transmits the networking recommendation to the first member device.

In a second embodiment, a method for operating a networking application is provided. The method includes storing a plurality of member profiles corresponding to a plurality of member devices including a first member profile corresponding to a first member device, where each member profile contains information about a member related to the member device; and receiving a new member application related to a second member device not included in the plurality of member profiles; determining member attributes of the second member profile based on the received new member application related to the second member device; generating a networking recommendation based on the member attributes, recommendation information, recommendation trigger information, and recommendation target information; and transmitting the networking recommendation to the first member device.

In another embodiment, a non-transitory computer readable medium for operating a networking application is provided. The non-transitory computer readable medium for operating a member networking application, comprising instructions stored thereon, that when executed cause a processor to store a plurality of member profiles corresponding to a plurality of member devices including a first member profile corresponding to a first member device, wherein each member profile contains information about a member related to the member device; receive a new member application related to a second member device not included in the plurality of member profiles; determine member attributes of the second member profile based on the received new member application related to the second member device; generate a networking recommendation based on the member attributes, recommendation information, recommendation trigger information, and recommendation target information; and transmit the networking recommendation to the first member device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure.

Exclusivity of an establishment can provide a sense of importance to people that have access. Limited-access or member-only establishments have member lists to determine access to different amenities provided by the establishment. The member list can include different levels of access for each member. Providing this exclusivity enhances the quality of the members for the purposes of networking.

Figure 1:
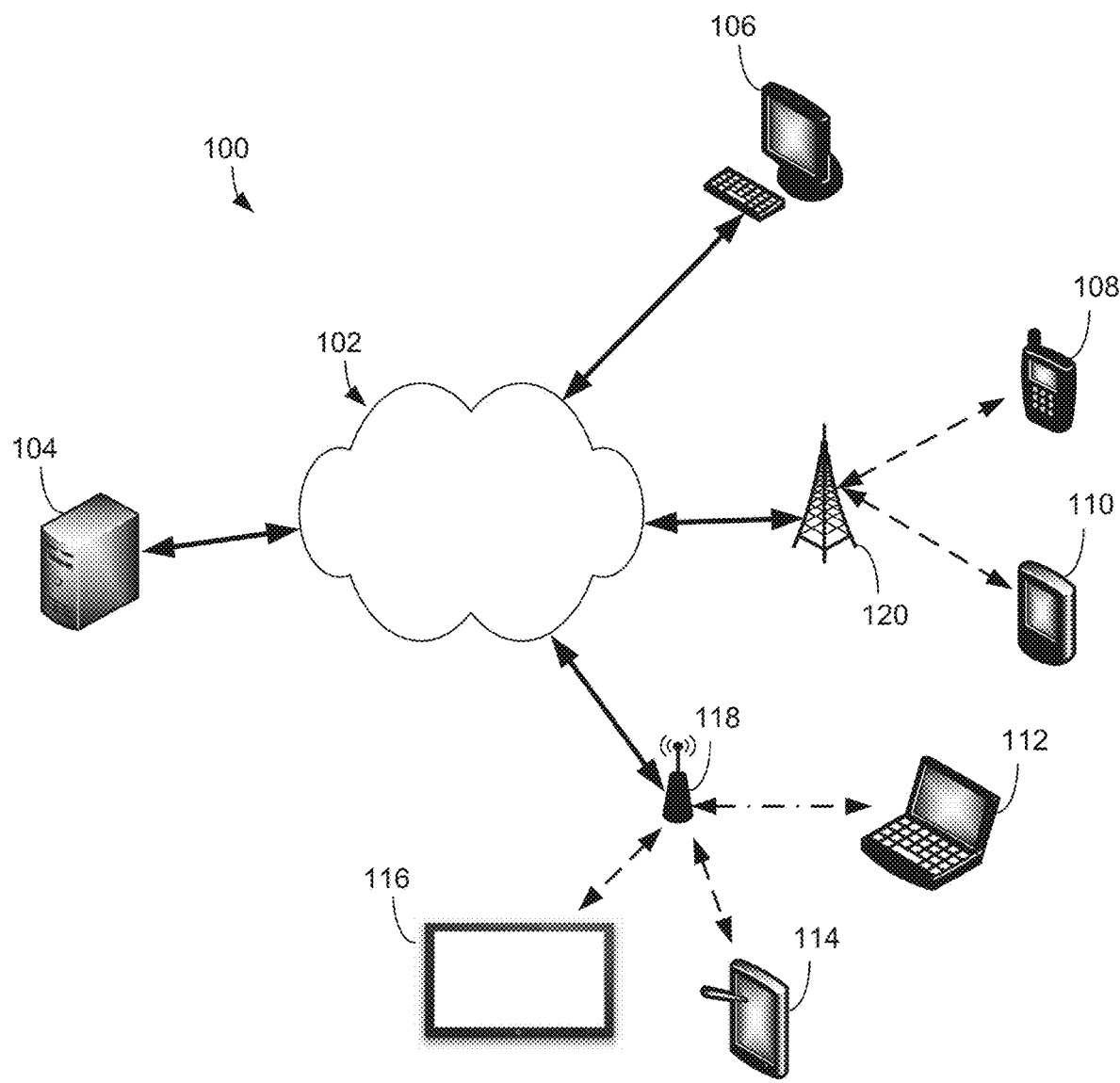
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various electronic devices 106-116. Each server 104 includes any suitable computing or processing device that can provide computing services for one or more electronic devices. Each server 104 could, for example, include one or more processing devices, one or more memories storing instructions and data, and one or more network interfaces facilitating communication over the network 102.

Each electronic device 106-116 represents any suitable computing or processing device that interacts with at least one server or other computing device(s) over the network 102. In this example, the electronic devices 106-116 include a desktop computer 106, a mobile telephone or smartphone 108, a personal digital assistant (PDA) 110, a laptop computer 112, a tablet computer 116, and a smart television (TV). However, any other or additional electronic devices could be used in the computing system 100.

In this example, some electronic devices 108-116 communicate indirectly with the network 102. For example, the electronic devices 108-110 communicate via one or more base stations 120, such as cellular base stations or eNodeBs. Also, the electronic devices 112-116 communicate via one or more wireless access points 118, such as IEEE 802.11 wireless access points. Note that these are for illustration only and that each electronic device could communicate directly with the network 102 or indirectly with the network 102 via any suitable intermediate device(s) or network(s).

As described in more detail below, the server 104 monitors an entry of an establishment for the electronic devices 108, 110, and 114 to determine their membership in order to allow access to an establishment. The server 104 also collects data related to a plurality of member in order to provide optimized recommendations between the plurality of member profiles for maximum efficiency of connections.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2A:
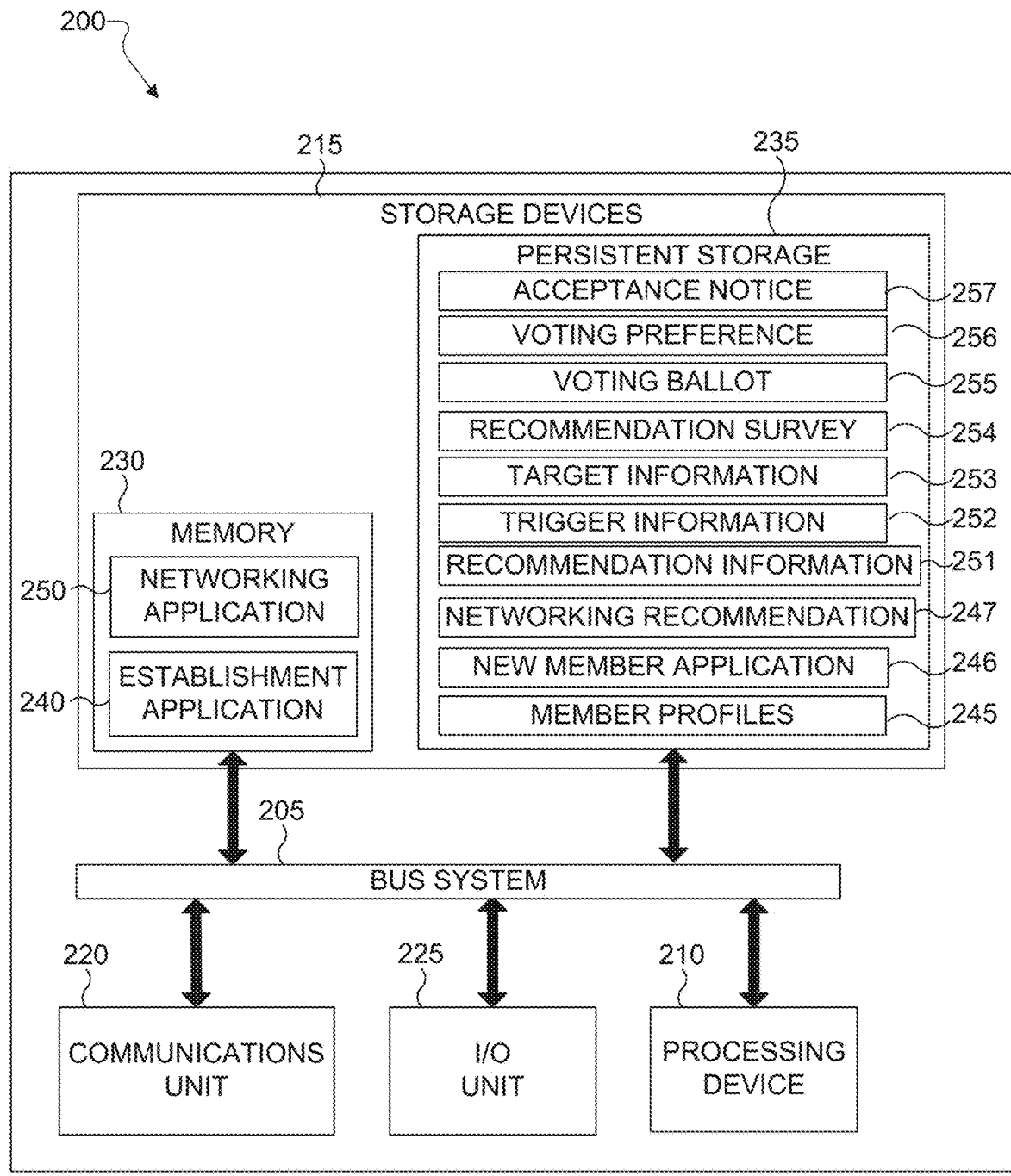
FIGS. 2A and 3 illustrate example devices in a computing system according to this disclosure.
Figure 2B:
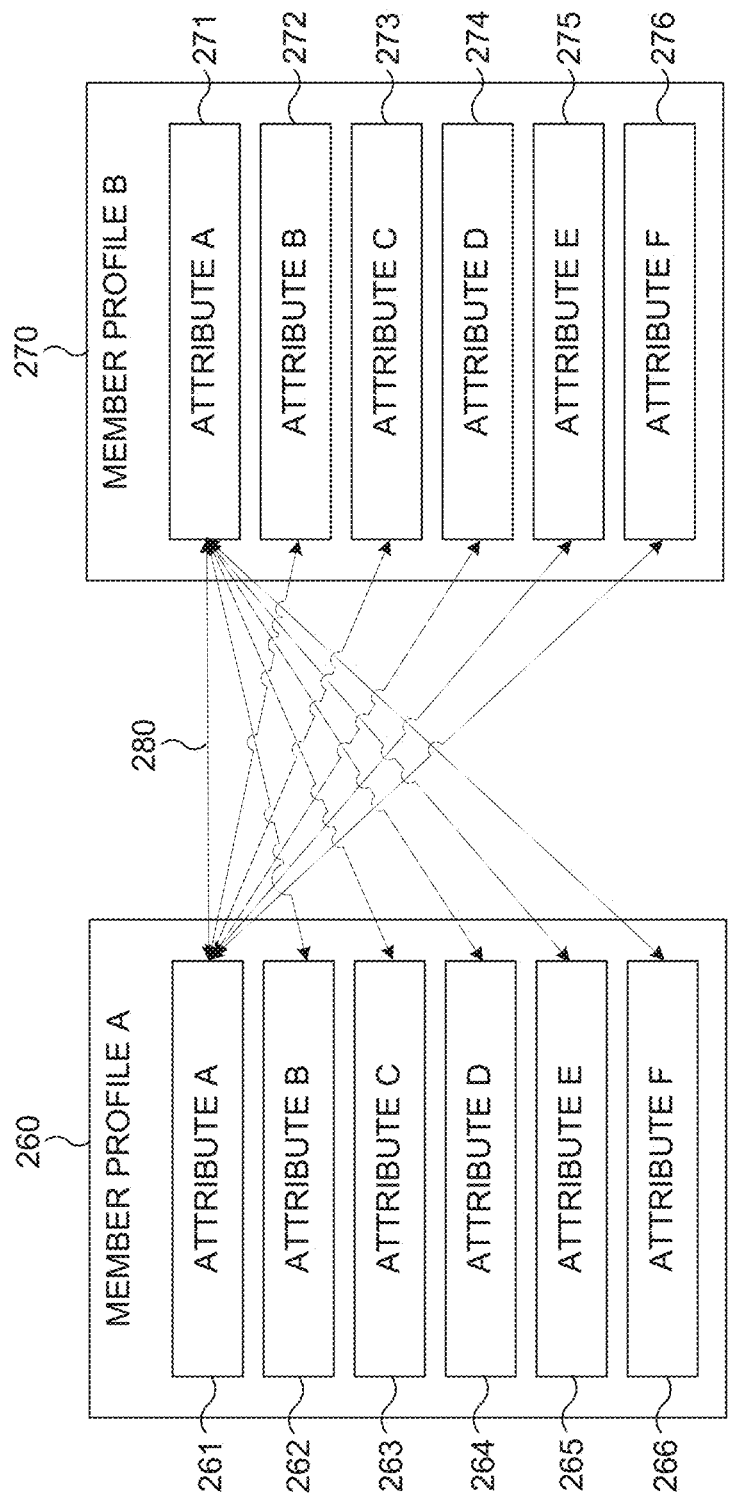
FIG. 2B illustrates an example links between a first profile and a second profile according to various embodiments of the present disclosure.
Figure 3:
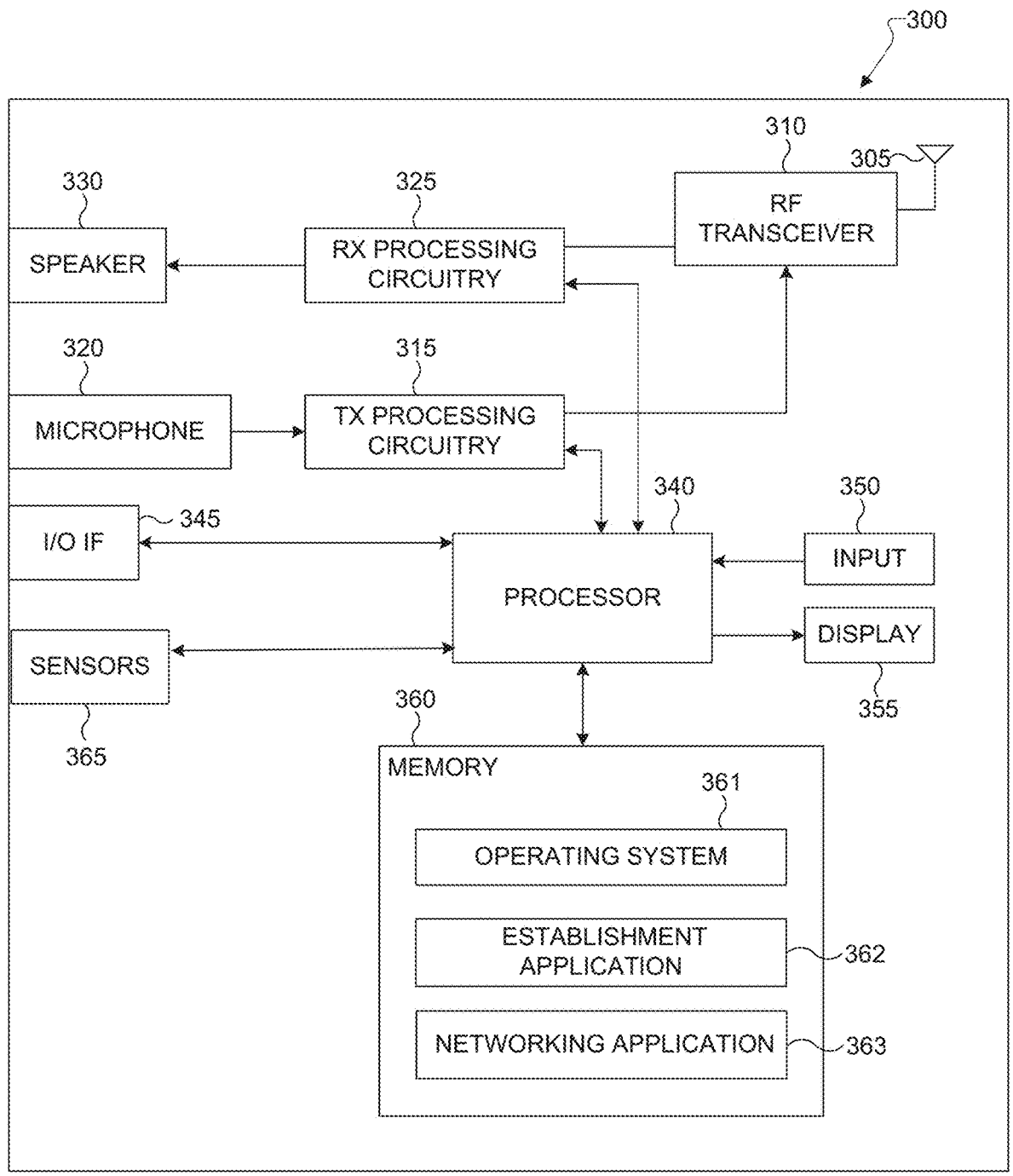

FIGS. 2 and 3 illustrate example devices in a computing system according to this disclosure. In particular, FIG. 2A illustrates an example server 200 for networking or an establishment, and FIG. 3 illustrates an example electronic device 300. The server 200 could represent the server 104 in FIG. 1, and the electronic device 300 could represent one or more of the electronic devices 106-116 in FIG. 1.

As shown in FIG. 2A, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The memory 230 may also represent a self-referential table for indexing data (such as member profiles 245). The memory 230 includes an establishment application 240 and a networking application 250. Although the establishment application 240 and the networking application 250 are described separately, both applications can provide the functions described in the Specification by either the establishment application 240 or the networking application 250. The establishment application 240 and the networking application 250 can be represented by a set of instructions that are executed by a processor.

The persistent storage 235 may contain one or more components or devices supporting longer-term storage of data, such as a ready only memory, hard drive, flash memory, or optical disc. The persistent storage 235 includes the member profiles 245 of the establishment, where each member profile contains information about the corresponding member, new member applications 246, networking recommendations 247, recommendation information 248, recommendation trigger information 252, recommendation target information 253, recommendation surveys 254, voting ballots 255, voting preferences 256, and acceptance notices 257. The persistent storage can include a repository to store data regarding the recommendations and the connections.

The establishment application 240 includes different modes for members, very important people (VIP) members, staff, and management. Depending on the mode of the establishment application 240, the establishment application 240 can control the access points of an establishment, transmit orders of food or beverage to the staff, allow members to view profiles of other members currently at the establishment, allow members to view profiles of currently nominated members, connect to other members, announce entry of a member, voting on new members, and monitor the entryways, members area, VIP area, staff areas, calling a cab, notifying valet, and management areas, as well as provide any other suitable function for networking, etc.

The establishment application 240 may improve processing speeds by automatically removing data from non-volatile memory storage space after a set time period. For example, the establishment application 240 could delete the member profile data of a user who has not returned to the establishment in 12 months. The establishment application 240 can be represented by a set of instructions that are executed by a processor. The establishment application 240 may also be in communication with the member entrance 420 and the member electronics 432. The establishment application 240 may control the access points of an establishment 400 by unlocking the member entrance 420 after the member electronics 432 has determined a member is an authorized member, and relocking the member entrance 420 after the authorized member has passed through the member entrance 420.

The establishment application 240 may be configured to allow an authorized member to bring a guest (an unauthorized member) to the establishment. For example, the establishment application 240 could unlock the member entrance 420 and allow the guest to enter through the member entrance 420, even though the member electronics 432 may recognize the guest as an unauthorized member.

The establishment application 240 can keep the member entrance 420 in a locked state when the member electronics 432 determines a member is an unauthorized member. The establishment application 240 may send information regarding the unauthorized member to a management device 456. The establishment application 240 may also display a member profile 245 associated with an authorized member on a device in telecommunication with the establishment application 240 when the authorized member passes through the member entrance 420. For example, the establishment application 240 may display the authorized member's member profile 245 on a television 440 in the member area 402 when the authorized member passes through the member entrance 420. The establishment application 240 may also include networking features.

The networking application 250 includes networking features that connect members who are seeking other members located in the member area based on a set of specified criteria. The network application 250 can be represented by a set of instructions that are executed by a processor. A set of specified criteria may include any information contained in a member profile 245. For example, a member could search for another member that satisfies the specified criteria such as, but not limited to, gender, previous work history, and education. The networking application 250 may notify a member when another member that satisfies the set of criteria has entered the member area. The networking application 250 can also be configured to notify both members (the member setting the criteria and the member satisfying the criteria). The networking application 250 can also control networking recommendations, new member applications, etc.

The member profiles 245 include all relevant member attributes or information for networking, for example, a photograph, name, occupation, company, years at job, previous work history, education history, etc. The member profiles 245 include a level of membership, for example, member, VIP, staff, management, etc. The member profiles 245 include user settings, for example, privacy of information in member profile 245, previous appearances at the establishment, previous tabs from the establishment, favorite beverages or food, favorite table, different family relations, previous and current nominations of members, links to member profiles on other social media or networking applications or websites, etc. The member profiles 245 may also include personal information or member attributes, for example, marital status, sexual orientation, gender, race, ethnicity, height, weight, etc. The member profiles 245 may also include a status section. For example, a VIP member may type "looking to hire a patent agent" in the status section.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2A is described as representing the server 104 of FIG. 1, the same or similar structure could be used in one or more of the electronic devices 106-116. For example, a laptop or desktop computer could have the same or similar structure as that shown in FIG. 2A.

As described in more detail below, the server 200 monitors an entry of an establishment for the electronic devices 108, 110, and 114 to determine their membership level in order to allow access to an establishment.

As shown in FIG. 3, the electronic device 300 includes an antenna 305, a radio frequency (RF) transceiver 310, transmit (TX) processing circuitry 315, a microphone 320, and receive (RX) processing circuitry 325. The electronic device 300 also includes a speaker 330, a processor 340, an input/output (I/O) interface (IF) 345, an input 350, a display 355, a memory 360, and sensors 365. The memory 360 includes an operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display unit 355. The operator of the electronic device 300 can use the input 350 to enter data into the electronic device 300. For example, the input 350 may be a keypad, touchscreen, button, etc. The display 355 may be a liquid crystal display or other display capable of rendering text and/or at least limited graphics, such as from web sites.

The memory 360 is coupled to the processor 340. Part of the memory 360 could include a random access memory (RAM), and another part of the memory 360 could include a flash memory or other read-only memory (ROM). The memory also includes an establishment application 362 for a controlled-access or members-only establishment and a networking application 363 for providing recommendations to member devices.

The establishment application 362 on the electronic device 300 includes different modes for members, very important people (VIP) members, staff, and management. Depending on the mode of the establishment application 362, the establishment application 240 can control the access points of an establishment, transmit orders of food or beverage to the staff, allow members to view member profiles of other members currently at the establishment, allow members to view profiles of currently nominated members, connect to other members, announce entry of a member, voting on new members, and monitor the entryways, members area, VIP area, staff areas, calling a cab, notifying valet, and management areas, as well as provide any other suitable function for networking, etc.

The networking application 250 tracks networking recommendations and membership connections. Networking recommendations are recommendations for a first member profile 245 to be introduced to a second member profile 245. The networking application 250 can notify both member profiles 245 of the networking recommendation and can also notify the management or staff when both member profiles are in the establishment or upon entry of the second member profile into the establishment. The networking application 250 can notify the management or staff in these situations to set up an introduction between the member profiles 245.

The networking application 250 creates a networking recommendation by reviewing stored information on a profile and matching the stored information with membership trends. The networking recommendations can be a function of a request in a profile. For example, a user can be in the market for purchasing a new home or investment property and the establishment application 240 could provide a list of recommendations of member profiles 245 of realtors to the user along with different factors automatically determined, such as the approval rate of other users accepting the recommendation, the reviews of the other users, the accepting rate of the recommendations by other users, reviews pulled from outside sources, etc.

Networking connections are connections between a first member profile and a second member profile. The establishment application 240 can track the networking connections and how they are connected. For example, the networking connections could occur through a networking recommendation of the establishment application 240, a networking recommendation from another user profile, a networking recommendation of management or staff, or from a spontaneous connection. The networking connections can be tracked through the establishment application monitoring the amount of time electronic devices associated with member profiles are in proximity to other electronic devices of other member profiles, the networking connections can be entered manually or by connecting electronic devices wiredly or wirelessly, accepted from a networking recommendation.

The sensors 365 could include any typical sensor found on an electronic device, including biometric sensors, location sensors, light sensors, proximity sensors, temperature sensors, vibration sensor, rotation sensors, global positioning system (GPS) sensors, etc.

As described in more detail below, the server 200 for an establishment or networking monitors an entry of an establishment for electronic devices 300 to determine their membership in order to allow access to an establishment.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, electronic devices and servers can come in a wide variety of configurations, and FIGS. 2 and 3 do not limit this disclosure to any particular electronic device or server.

Figure 4:
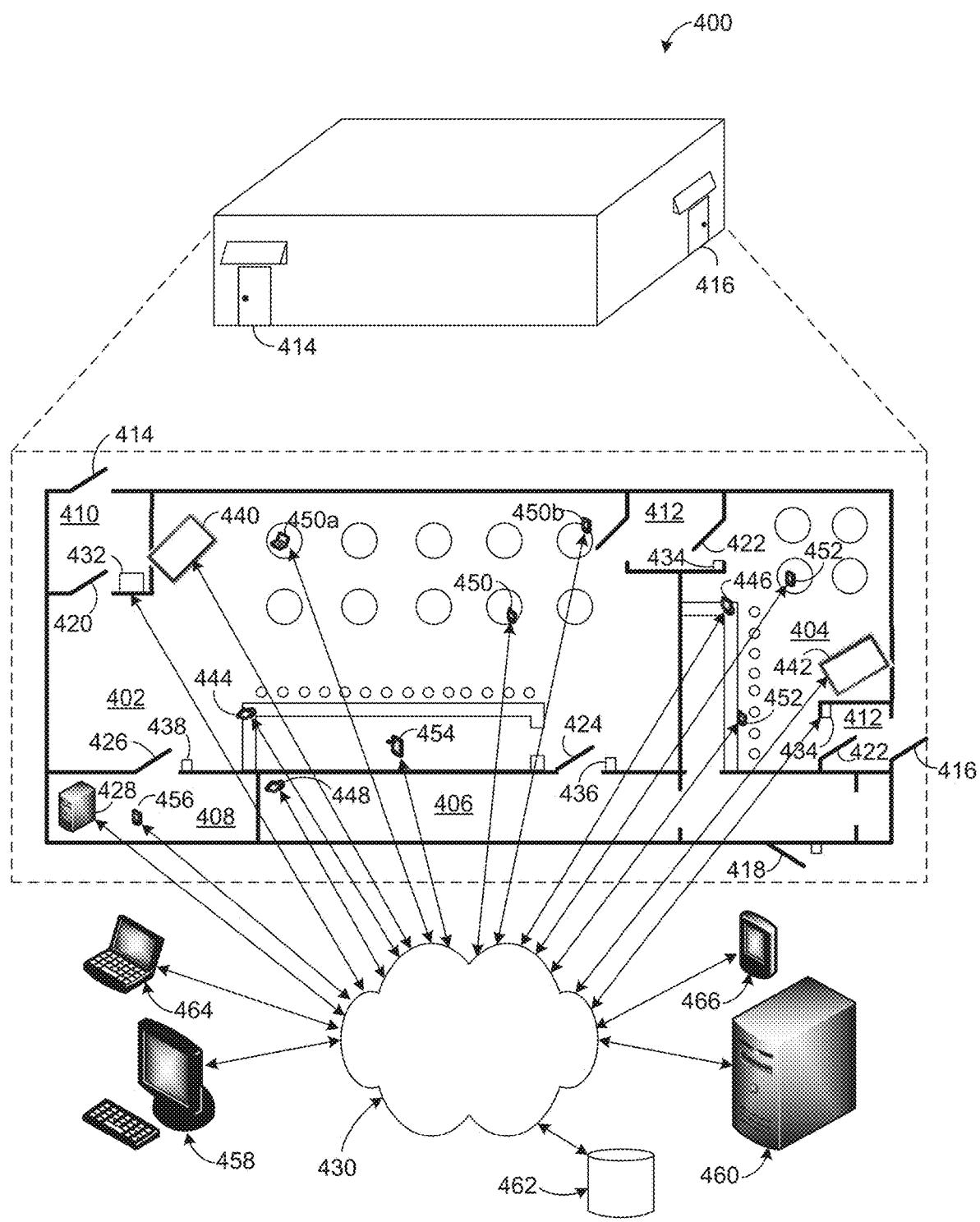
FIG. 4 illustrates an example controlled-access or members-only establishment using the establishment application according to various embodiments of the present disclosure.

FIG. 4 illustrates an example controlled-access or members-only establishment 400 using the establishment application 240 according to various embodiments of the present disclosure. The embodiment shown in FIG. 4 is for illustration only. Other embodiments could be used without departing from the scope of the present disclosure. Hereinafter, member devices 300 include member devices 450, a first member device 450a, and a second member device 450b, VIP member devices 452, staff devices 454, member point of sale (POS) 444, VIP POS 446, management devices 456, remote member devices 464, remote VIP member devices 466 and remote management devices 458. The server 200 includes establishment server 428, remote establishment server 460, and remote database 462.

The establishment 400 includes a plurality of areas including member area 402, VIP member area 404, staff area 406, management area 408, member entryway 410, and VIP member entryway 412. The establishment 400 can function as any establishment venue, including a bar, restaurant, club, lounge, music venue, standup comedy club, saloon, speakeasy, gym, spa, country club, dining club, pool hall, poker room, gentleman's club, Turkish bath, religious institution, bingo parlor, etc. The establishment 400 can be a free standing structure or a portion of structure. The establishment 400 can include different entrances based on membership level of a member profile 245. For example, a front entrance 414, or member entrance 420, to a member entryway 410 can be used by member profiles, VIP member profiles, and management profiles. A side entrance 416, or VIP member entrance 422, to a VIP member entryway 412 can be used by VIP member profiles and management profiles. A back entrance or staff entrance 418, to a staff area 406 can be used by staff profiles and management profiles. While the respective front entrance 414, side entrance 416 or back entrance are illustrated as providing access to the respective areas, other embodiments can include access to the different areas of the establishment 400 on different side of the establishment 400. In certain embodiments, the establishment 400 can include multiple entrances for a single area. The establishment 400 can also include multiple entrances on one side of the establishment 400 for different areas.

The member entryway 410 includes a front entrance 414, a member entrance 420 and member electronics 432. The member entryway 410 allows a member to not wait outside while membership is being verified. The member entryway 410 also can provide a limited area for controlling access based on the number of members located in the member entryway 410. The member entryway 410 can also provide an area for the proximity to the member entrance 420 required for member verification.

The front entrance 414 is a door allowing a member to enter the member entryway 410 from outside the establishment 400. In certain embodiments, the member entryway 410 can be an area outside of the establishment 400 with a single door for the member entrance 420.

The member entrance 420 remains in a locked state until a member located in the member entryway 410 is verified as a member of the establishment 400. The member electronics 432 can include a number of pieces of equipment used in member verification. The member electronics 432 can also include equipment or sensors configured to run a recognition process used in member identification.

A recognition process is a process that compares a subject against a set database to verify the subject's identity. The member electronics 432 can also be configured to determine, based on the results of a recognition process, whether a member is an authorized member or an unauthorized member. Determining whether a member is an authorized member or an unauthorized member is one form of member verification the member electronics 432 can be configured to perform.

The member electronics 432 can include a keypad for entering a code for entrance. The member electronics 432 can include a fingerprint recognition device that verifies a member for entry. The member electronics 432 may also include a facial recognition device that determines whether a member is an authorized member or an unauthorized member. The member entrance, in connection with the member electronics and establishment application, improves upon previous systems by more efficiently managing access to an establishment.

In certain embodiments, the member entrance, member electronics, and establishment application work in conjunction to rapidly identify members, determine the member is an authorized member, unlock the member entrance, and relock the member entrance after the authorized member has passed through the member entrance.

The member electronics 432 can include a Wi-Fi hotspot that verifies the member device 300 once connected. The member electronics 432 can include an NFC or BLUETOOTH reader that can communicate with the member device 300 to verify the member profile 245. The member electronics 432 can include a device for capturing an image or video of the member located in the member entryway 410 to display, for example, on a television 440, on an establishment application 362 on a member device 300 located in the establishment 400, remote management device 458, or saved to a member profile 245 on the establishment server 428, remote database 462, or remote establishment server 460. The member electronics 432 can also include a microphone 320 or a speaker 330 for communicating with management of the establishment 400. In certain embodiments, the establishment application 362 can produce an audio or visual signal that is detected by the member electronics 432 for member verification.

The member electronics 432 can be configured to determine a member is an authorized member when the recognition process associates the member with a member profile 245 stored on a server 104 in telecommunication with the establishment application 240. For example, the member electronics 432 can identify the member using a recognition process, compare the identified member against member profiles 245, and if the member electronics 432 associates the member with a member profile 245, then the member electronics 432 can determine the member is an authorized member.

Similarly, the member electronics 432 may determine a member is an unauthorized member when the recognition process does not associate the member with a member profile 245 stored on a server 104 in telecommunication with the establishment application 362. For example, the member electronics 432 can identify the member using a recognition process, compare the identified member against member profiles 245, and if the member electronics 432 does not associate the member with a member profile 245, then the member electronics 432 can determine the member is an unauthorized member.

The member electronics 432 may also determine a member is an unauthorized member when the identified member is associated with a member profile 245 on a banned list created by the management device 456. For example, the member electronics 432 can identify the member using a recognition process, compare the identified member against member profiles 245, and if the member electronics 432 associates the member with a member profile 245 on a banned list of members, then the member electronics 432 can determine the member is an unauthorized member.

The member electronics 432 can determine a member is an unauthorized member based on a parameter. The parameter may include time of day, the date of the week, a staff member's work schedules, a staff member's time sheet, or a member's membership level. For example, the member electronics 432 can identify the member using a recognition process, compare the identified member against the time of day, and if the time of day is 2:00 pm, but the establishment is closed for members until 5:00 pm, then the member electronics 432 can determine the member is an unauthorized member. In another example, the member electronics 432 may identify the member as a staff member, compare the staff member against the staff member's time sheet, and if the staff member has already worked 45 hours that week and the member electronics 432 is set to deny entry to staff members that have worked more than 40 hours in one week, then the member electronics 432 can determine the staff member is an unauthorized staff member.

The member profile 245 can include settings for a specific method of entrance verification or exclude methods of entrance verification. For example, a member might not have an electronic device with an NFC or BLUETOOTH card and can exclude those methods to protect from a non-member gaining attempting to gain access with the member profile 245.

The establishment application 240 can be programmed to limit the access of members to the establishment 400 through the member entrance 420 based on the level of the member profile 245, time of day, day of the week, holidays, etc. For example, an establishment 400 might be required by a liquor license for certain times of the day (such as 10 AM-2 AM). The member entrance 420 could be limited to these hours for all member profile 245 or specific member profiles 245. Access through the member entrance 420 can also be given on a temporary basis for reasons such as vendors or staff during non-operating hours or for potential members that have been nominated but do not have full membership status.

The establishment application 240 may also be programmed to limit the access of members to the establishment 400 through the member entrance 420 based on the number of members currently in the establishment 400. For example, the establishment 400 might be required by a fire marshal to not exceed a maximum occupancy of one-hundred patrons at one time. The member entrance 420 could be programmed to limit entry into the establishment 400 until the number of patrons in the establishment 400 reaches a suitable number.

The establishment application 240 may also be programmed to limit the access of members to the establishment 400 through the member entrance 420 based on a banned list. For example, management may have a list of members who are banned from the establishment 400 based on prior conduct. The member entrance 420 could be programmed to deny a member entry into the establishment 400 if the member is on the banned list. Management may place a member on or remove a member from the banned list through the management device 456.

The VIP member entryway 412 includes a side entrance 416, a VIP member entrance 422 and VIP member electronics 434. The VIP member entryway 412 allows a member to not wait outside while membership is being verified. The VIP member entryway 412 also can provide a limited area for controlling access based on the number of members located in the VIP member entryway 412. The VIP member entryway 412 can also provide an area for the proximity to the VIP member entrance 422 required for member verification. In certain embodiments, the establishment 400 can include a VIP member entryway 412 in the interior of the establishment 400 between a member area 402 and a VIP member area 404.

The side entrance 416 is a door allowing a member to enter the VIP member entryway 412 from outside the establishment 400. In certain embodiments, the VIP member entryway 412 can be an area outside of the establishment 400 with a single door for the VIP member entrance 422.

The VIP member entrance 422 remains in a locked state until a VIP member located in the VIP member entryway 412 is verified as a VIP member of the establishment 400. The VIP member electronics 434 can include a number of pieces of equipment used in member verification. The VIP member electronics 434 can also include equipment configured to run a recognition process used in VIP member verification.

The VIP member electronics 434 can also be configured to determine, based on the results of a recognition process, whether a member is an authorized VIP member or an unauthorized VIP member. Determining whether a member is an authorized VIP member or an unauthorized VIP member is one form of VIP member verification the VIP member electronics 434 can be configured to perform.

The VIP member electronics 434 can include a keypad for entering a code for entrance. The VIP member electronics 434 can include a Wi-Fi hotspot that verifies the member device 300 once connected. The VIP member electronics 434 can include a fingerprint recognition device that verifies a member for entry. The VIP member electronics 434 may also include a facial recognition device that verifies a member for entry. The VIP member electronics 434 can include an NFC or BLUETOOTH reader that can communicate with the member device 300 to verify the member profile 245. The VIP member electronics 434 can include a device for capturing an image or video of the member located in the VIP member entryway 412 to display, for example, on a television 440, on an establishment application 362 on a member device 300 located in the establishment 400, remote management device 458, or saved to a member profile 245 on the establishment server 428, remote database 462, or remote establishment server 460. The VIP member electronics 434 can also include a microphone 320 or a speaker 330 for communicating with management of the establishment 400.

In certain embodiments, the establishment application 362 can produce an audio or visual signal that is detected by the VIP member electronics 434 for member verification. The VIP member electronics 434 can be the same as or different from the member electronics 432 at an establishment 400. In certain embodiments, the VIP member electronics 434 may not include a device for capturing an image or video of the VIP members for privacy or other reasons.

The member profile 245 can also include settings for entrance announcement. The entrance announcement may display information from the member profile 245 of the user. For example, a VIP member might only want their arrival at the establishment 400 broadcasted to the television 440 or VIP member devices 452 in the VIP member area 404 and not broadcasted to the television 440 or member devices 450 in the member area 402. The VIP member may also only want to broadcast a photograph from their member profile 245 and not broadcast their work history. A member may also send a request to the establishment application 240 to broadcast an announcement after entering the establishment 400. For example, a VIP member may send a request to the establishment application 240 to broadcast the status section of their member profile (e.g., "looking to hire a patent agent") on the television 440 in the establishment 400. In another embodiment, the establishment application 240 displays and cycles through the member profiles 245 of members currently at the establishment 400 on the television 440.

The establishment application 240 can be programmed to limit the access of members to the establishment 400 through the VIP member entrance 422 based on the level of the member profile 245, time of day, day of the week, holidays, etc. For example, an establishment 400 might be required by a liquor license for certain times of the day (such as 10 AM-2 AM). The VIP member entrance 422 could be limited to these hours for all member profile 245 or specific member profiles 245. Access through the VIP member entrance 422 can also be given on a temporary basis for reasons such as members desiring to upgrade their membership status.

The establishment application 240 may also be programmed to limit the access of members to the establishment 400 through the VIP member entrance 422 based on the number of members currently in the establishment 400. For example, the establishment 400 might be required by a fire marshal to not exceed a maximum occupancy of one-hundred patrons at one time. The VIP member entrance 422 could be programmed to limit entry into the establishment 400 until the number of patrons in the establishment 400 reaches a suitable number.

The establishment application 240 may also be programmed to limit the access of members to the establishment 400 through the VIP member entrance 422 based on a banned list. For example, management may have a list of members who are banned from the establishment 400 based on prior conduct (such as starting a fight). The VIP member entrance 422 could be programmed to deny a member entry into the establishment 400 if the member is on the banned list. Management may place or remove a member on the banned list through the management device 458.

The back entrance is a door allowing a member to enter the staff area 406 from inside or outside the establishment 400. The staff entrance 418 remains in a locked state until a staff or manager located in the proximity is verified as a staff management of the establishment 400.

The staff electronics 436 can include a number of pieces of equipment used in staff verification. The staff electronics 436 can also include equipment configured to run a recognition process used in staff verification. The staff electronics 436 can also be configured to determine, based on the results of a recognition process, whether a member is an authorized staff member or an unauthorized staff member. Determining whether a member is an authorized staff member or an unauthorized staff member is one form of staff verification the staff electronics 436 can be configured to perform.

The staff electronics 436 can include a keypad for entering a code for entrance. The staff electronics 436 can include a fingerprint recognition device that verifies a member for entry. The staff electronics 436 may also include a facial recognition device that verifies a member for entry. The staff electronics 436 can include a Wi-Fi hotspot that verifies the member device 300 once connected. The staff electronics 436 can include an NFC or BLUETOOTH reader that can communicate with the member device 300 to verify the member profile 245. The staff electronics 436 can include a device for capturing an image or video of the staff located outside the staff area 406 to display, for example, on a remote management device 458, or saved to a member profile 245 for the staff member on the establishment server 428, remote database 462, or remote establishment server 460. The staff electronics 436 can also include a microphone 320 or a speaker 330 for communicating with management of the establishment 400. In certain embodiments, the establishment application 362 can produce an audio or visual signal that is detected by the staff electronics 436 for staff verification.

The establishment application 240 can be programmed to limit the access of members of the establishment through the staff entrance 418 to keep members from entering the staff area 406. The establishment application 240 can also be programmed to limit the access of staff to the establishment 400 through the staff entrance 418 based on the work schedule, time of day, day of the week, holidays, etc. For example, an establishment 400 might not want staff that is not currently on the work schedule from accessing the staff area 406. Access through the staff entrance 418 can also be given on a temporary or single use basis for reasons such as vendors or staff during non-operating hours or for members to escape unnoticed out the staff entrance 418.

The establishment application 240 can also be programmed to limit the access of staff to the establishment 400 through the staff entrance 418 based on the number of hours worked. For example, management might not want staff to work more than 40 hours a week. The staff entrance 418 can be programmed to deny a staff member entry to the staff area 406 that has already worked more than 40 hours that week by referencing the staff member's time sheet or work schedule.

The management door 426 is a door allowing a manager to enter the management area 408 from inside or outside the establishment 400. The management door 426 remains in a locked state until a manager located in the proximity is verified as a staff management of the establishment 400. The management electronics 438 can include a number of pieces of equipment used in staff verification. The management electronics 438 can also include equipment configured to run a recognition process used in management verification.

The management electronics 438 can also be configured to determine, based on the results of a recognition process, whether a member is an authorized staff member or an unauthorized staff member. Determining whether a member is an authorized staff member or an unauthorized staff member is one form of staff verification the management electronics 438 can be configured to perform.

The management electronics 438 can include a keypad for entering a code for entrance. The management electronics 438 can include a fingerprint recognition device that verifies a member for entry. The management electronics 438 may also include a facial recognition device that verifies a member for entry. The management electronics 438 can include a Wi-Fi hotspot that verifies the member device 300 once connected. The management electronics 438 can include an NFC or BLUETOOTH reader that can communicate with the member device 300 to verify the member profile 245. The management electronics 438 can include a device for capturing an image or video of the manager located outside the management area 408 to display, for example, on a remote management device 458, or saved to a member profile 245 for the manager on the establishment server 428, remote database 462, or remote establishment server 460. The management electronics 438 can also include a microphone 320 or a speaker 330 for communicating with management of the establishment 400. In certain embodiments, the establishment application 362 can produce an audio or visual signal that is detected by the management electronics 438 for manager verification.

The establishment application 240 can be programmed to limit the access of members and staff of the establishment through the management door 426 to keep members from entering the management area 408. For example, an establishment 400 might be not want staff accessing the management area 408. Access through the management door 426 can also be given on a temporary or single use basis for reasons such as permission from a manager.

The member area 402 provides networking opportunities for members and VIP members that are at the establishment 400. The establishment application 240 can monitor the members that are currently at the establishment for display on the establishment application 362 on the member devices 300.

The VIP member area 404 provides networking opportunities for VIP members that are at the establishment 400. The establishment application 240 can monitor the VIP members that are currently at the establishment for display on the establishment application 362 on the VIP member devices 452, remote VIP member device 466, staff devices 454, management devices 456, remote management devices 458, POS devices 444, and VIP POS devices 446.

The member profile 245 can also include different operations to be performed by the establishment application 240 upon detecting a member profile 245 by the member electronics 432. The member profile 245 can require the establishment application 240 to notify member devices 300 of the entrance of the member. For example, a member entering through the member entrance 420 could be announced on the televisions located in the member area 402 and the VIP member area 404, while a VIP member can change the setting to only display the member profile 245 on the television in the VIP member area 404 regardless of entering through the member entrance 420 or the VIP member entrance 422.

The member profile 245 can require the establishment application 240 to transmit a food or beverage order to the member POS 444 or VIP member POS 446 upon the entrance of the member. For example, the establishment application 240 will detect a member entering through the member entrance 420 and transmit a beverage order to the member POS 444 in order to expedite serving the member a beverage.

The member profile 245 can require the establishment application 240 reserve an open or specific table. For example, a member profile 245 includes a favorite table to reserve, if available, and the establishment application 240 reserves the favorite table upon entrance of the member.

Although FIG. 4 illustrates examples of a controlled-access or members-only establishment 400 using an establishment application, various changes may be made to FIG. 4. For example, various components in FIG. 4 could be combined, further subdivided, or omitted and additional components could be added according to particular needs. As a particular example, the controlled-access or members-only establishment 400 could be further divided to include more member areas 402, VIP areas 404, worker areas 406 or management areas 408. In addition, controlled-access or members-only establishments can come in a wide variety of configurations and FIG. 4 does not limit this disclosure to any particular electronic device.

Figure 5:
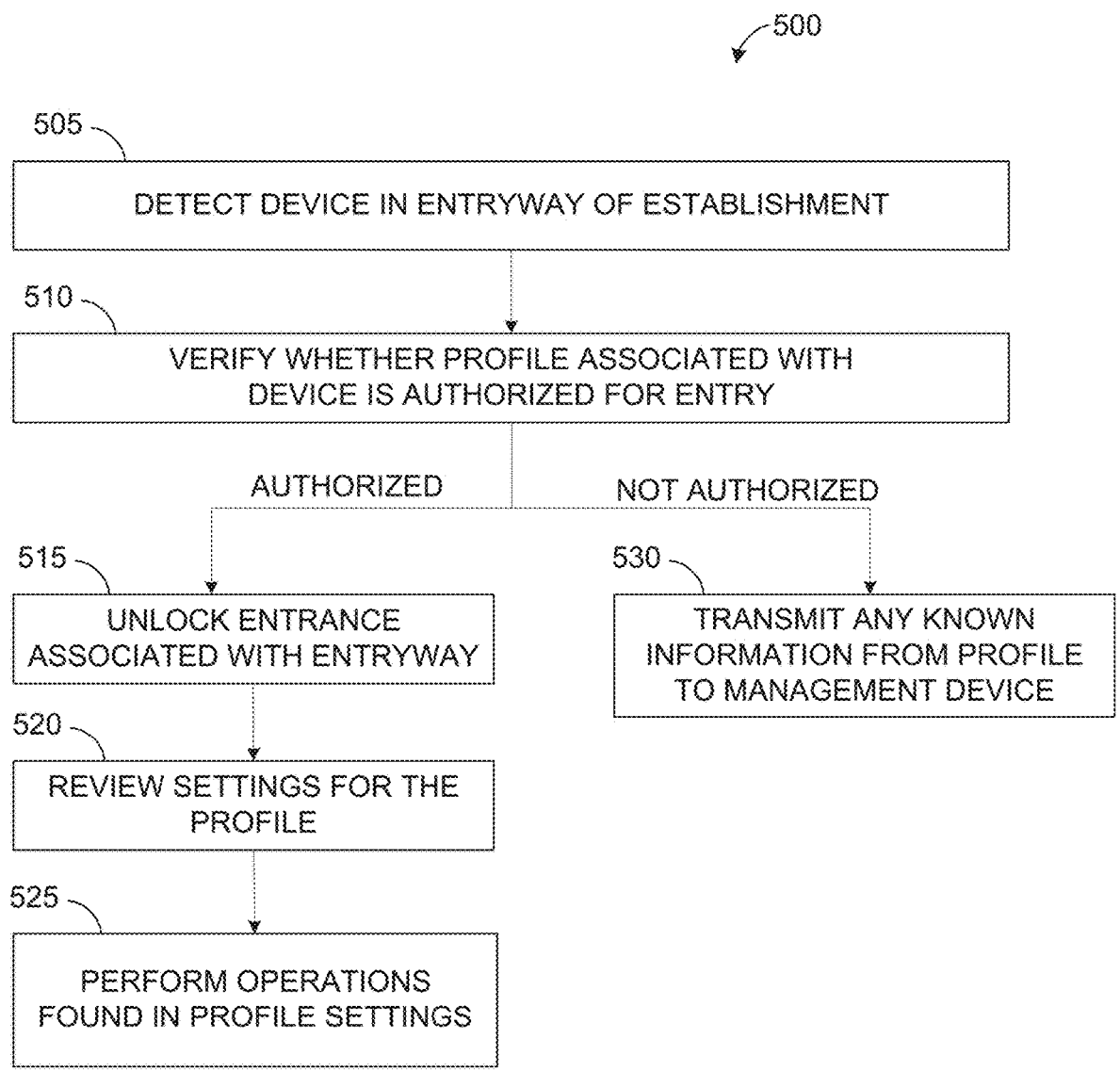
FIG. 5 illustrates a process for operating a controlled-access or members-only establishment in accordance with various embodiments of the present disclosure.

FIG. 5 illustrates a process 500 for operating a controlled-access or members-only establishment in accordance with various embodiments of the present disclosure. For example, the process 500 depicted in FIG. 5 may be performed by the establishment server 428 in FIG. 4. The process may also be implemented by server 200 in FIG. 2A or server 104 in FIG. 1. While the process 500 is described as being performed by the establishment application 240, the process 500 can also be performed by the networking application 250.

In operation 505, the establishment application 240 detects a member device 300 at an entrance of an establishment 400. The member entrance 420 remains in a locked state until a member located in the member entryway 410 is verified as a member of the establishment 400.

The member electronics 432 can include a number of pieces of equipment used in member verification. The member electronics 432 can include a keypad for entering a code for entrance. The member electronics 432 can also include equipment configured to run a recognition process used in member verification. The member electronics 432 can also be configured to determine, based on the results of a recognition process, whether a member is an authorized member or an unauthorized member. Determining whether a member is an authorized member or an unauthorized member is one form of VIP member verification the member electronics 432 can be configured to perform.

The member electronics 432 can include a fingerprint recognition device that verifies a member for entry. The member electronics 432 may also include a facial recognition device that verifies a member for entry. The member electronics 432 can include a Wi-Fi hotspot that verifies the member device 300 once connected. The member electronics 432 can include an NFC or BLUETOOTH reader that can communicate with the member device 300 to verify the member profile 245. The member electronics 432 can include a device for capturing an image or video of the member located in the member entryway 410 to display, for example, on a television 440, on an establishment application 362 on a member device 300 located in the establishment 400, remote management device 458, or saved to a member profile 245 on the establishment server 428, remote database 462, or remote establishment server 460. The member electronics 432 can also include a microphone 320 or a speaker 330 for communicating with management of the establishment 400. In certain embodiments, the establishment application 362 can produce an audio or visual signal that is detected by the member electronics 432 for member verification.

In operation 510, the establishment application 240 verifies a member profile 245 associated with the member device 300 is authorized for entry. The establishment application 240 takes the information captured by the member electronics 432 to identify a member profile 245 on the establishment server. Once the member profile 245 associated with the member device 300 is identified, the establishment application 240 determines whether the member profile 245 is authorized for entry at the member entrance 420.

In operation 515, when the member profile 245 is authorized, the establishment server 428 unlocks, authorizes entry, or otherwise provides access to the establishment via the member entrance 420. The member is provided access to the member area 402. Once the member has pass through the member entrance into the establishment, the establishment server 428 relocks the member entrance.

In operation 520, the establishment application 240 reviews the profile settings for the user. The member profile 245 can also include different operations to be performed by the establishment application 240 upon detecting a member profile 245 by the member electronics 432. The member profile 245 can require the establishment application 240 to notify member devices 300 of the entrance of the member. The member profile 245 can require the establishment application 240 to transmit a food or beverage order to the member POS 444 or VIP member POS 446 upon the entrance of the member. The member profile 245 can require the establishment application 240 reserve an open or specific table.

In operation 525, the establishment application 240 performs any operations found in the profile settings. The establishment application 240, upon a member entering through the member entrance 420, announces on the televisions located in the member area 402 and the VIP member area 404. The establishment application 240 reserves the favorite table upon entrance of the member. The establishment application 240 transmits a beverage order to the member POS 444 in order to expedite serving the member a beverage.

In operation 530, when the member profile 245 is not authorized, the establishment application 240 transmits any known information from the member profile 245 to the management devices 456, remote management devices 458, the remote database 462, the establishment server 428, and the remote establishment server 460. The documentation of the non-authorized member can notify the management for the purposes of denying service, security of the members, and avoiding nuisances.

Although FIG. 5 illustrates an example a process for operating a controlled-access or members-only establishment, respectively, various changes could be made to FIG. 5. For example, while shown as a series of steps, various steps in each figure could overlap, occur in parallel, occur in a different order, or occur multiple times.

Figure 6:
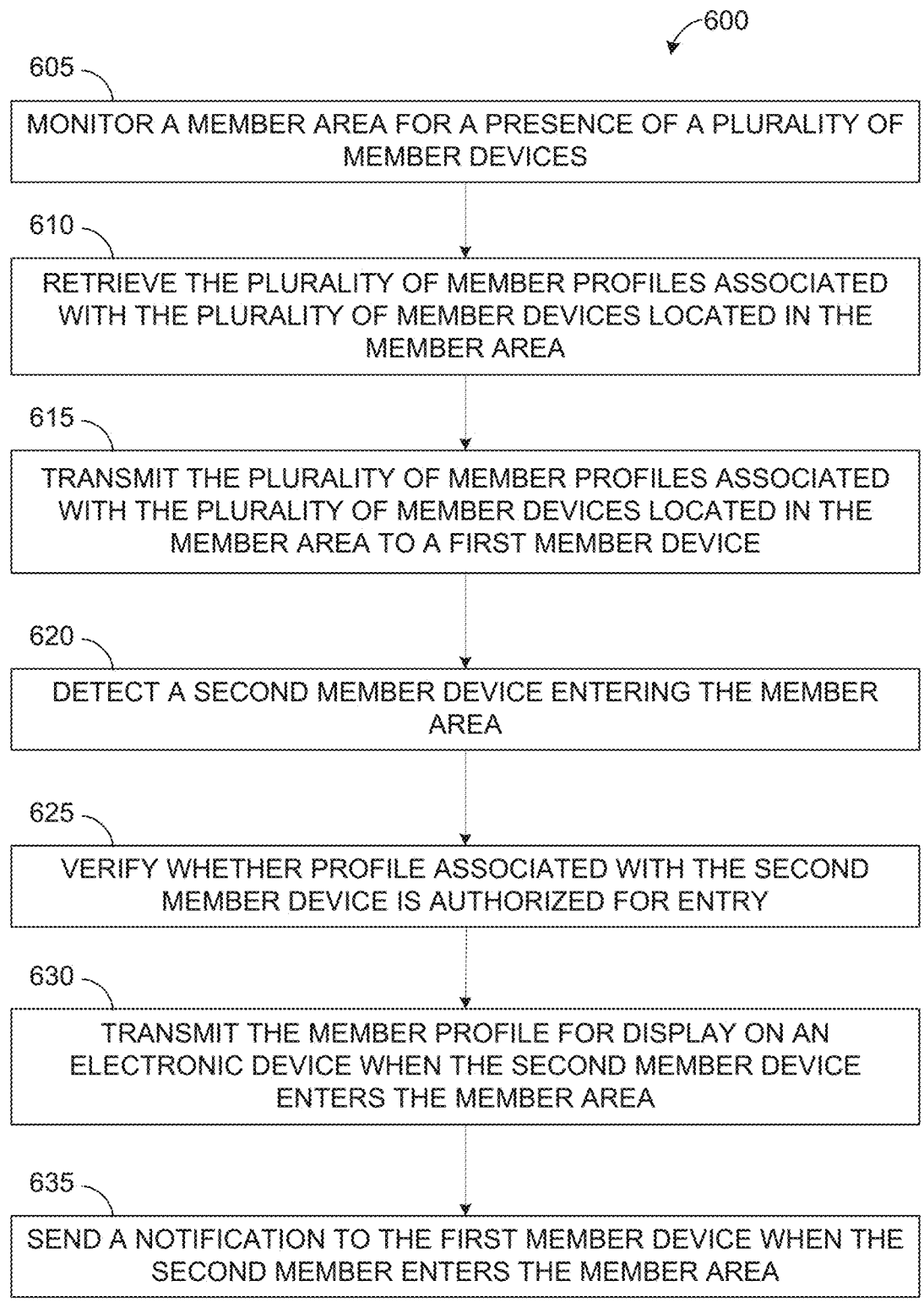
FIG. 6 illustrates a process for operating an establishment application in accordance with various embodiments of the present disclosure.

FIG. 6 illustrates a process 600 for operating an establishment application in accordance with various embodiments of the present disclosure. For example, the process depicted in FIG. 5 may be performed by the establishment server 428 in FIG. 4. The process 600 may also be implemented by server 200 in FIG. 2A or server 104 in FIG. 1. While the process 600 is described as being performed by the establishment application 240, the process 600 can also be performed by the networking application 250.

In operation 605, the establishment application 240 monitors a member area for a presence of a plurality of member devices, where each member device is associated with one of the plurality of member profiles. The establishment application 240 can determine the member devices that are present once the establishment application 240 begins operating.

In operation 610, the establishment application 240 retrieves the plurality of member profiles associated with the plurality of member device located in the member area. The establishment application 240 can verify that member profiles that are currently present in the establishment upon starting operation are authorized. The verification of members currently in the establishment can include for example facial recognition, matching a thumbprint in the member profile to a thumbprint sensed by a thumbprint sensor on the member device, a special code or identifier related to the member device, passwords or security questions related to the member profile, or any other form of authorization.

In operation 615, the establishment application 240 transmits the plurality of member profiles associated with the plurality of member devices located in the member area to a first member device. Each of the members in the establishment upon the establishment application 240 can receive a list of the other members that are currently in the establishment.

In operation 620, the establishment application 240 detects a second member device entering the member area. The second member device attempt to enter the establishment through a member entrance. The second member device is detected using a component of the phone that can be detected or operated to communicate with the establishment. The second member can use the establishment application 362 to inform the establishment application 240 of its arrival.

In operation 625, the establishment application 240 verifies whether a member profile associate with the second member device is authorized for entry. The verification of members entering through a member entrance in the establishment can include for example facial recognition, matching a thumbprint in the member profile to a thumbprint sensed by a thumbprint sensor on the member device, a special code or identifier related to the member device, passwords or security questions related to the member profile, or any other form of authorization.

In operation 620, the establishment application 240 transmits the member profile associated with the second member device for display on an electronic device of the establishment when the second member enters the member area. The electronic device can include a display located at one or more convenient positions for viewing (e.g. above the entrance, above the bar, bathrooms, etc.).

In operation 625, the establishment application 240 sends a notification to the first member device when the second member device enters the member area. The first member device also includes management and staff devices. The notification can be customized by both the member entering the establishment and the individual members currently present at the establishment.

The customization of the notification causes the minimal amount of information to be sent based on the preference for both the entering member and the present members. For example, for an entering member preference to transmit all available information and a present member preference to only receive a picture and name for the entering member, only the picture and name of the entering member are included with the notification. In the alternative, an entering member with preferences only allowing a picture and their name and the present member with a preference for receiving all possible information, the notification may still only include the picture and the name. Either the entering member or the present member can further customize the notification preferences to not be transmitted or receive in an amount of information is not available. For example, when the entering member allows only the name and face to be transmitted in the notification and the present member requires that the name, face, and occupation are to be received, a notification is not transmitted to the specific present member with these preferences.

Although FIG. 6 illustrates an example a process 600 for operating an establishment application, respectively, various changes could be made to FIG. 6. For example, while shown as a series of steps, various steps in each figure could overlap, occur in parallel, occur in a different order, or occur multiple times.

Figure 7:
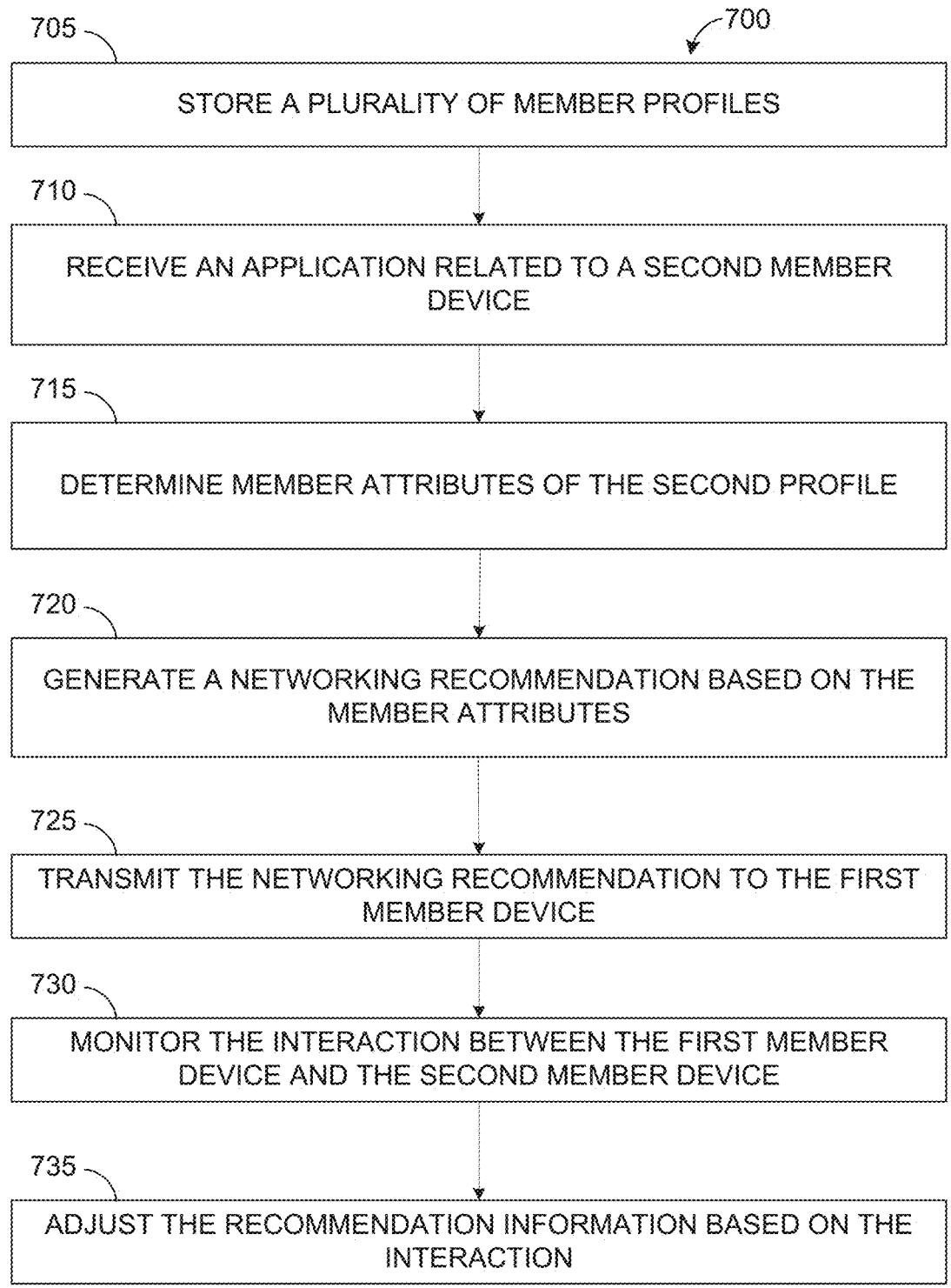
FIG. 7 illustrates a process for operating a network application in accordance with various embodiments of the present disclosure.

FIG. 7 illustrates a process 700 for operating a network application in accordance with various embodiments of the present disclosure. For example, the process 700 depicted in FIG. 7 may be performed by the establishment server 428 in FIG. 4. The process may also be implemented by server 200 in FIG. 2A or server 104 in FIG. 1. While the process 700 is described as being performed by the networking application 250, the process 700 can also be performed by the establishment application 240.

In operation 705, the networking application 250 stores a plurality of member profiles corresponding to a plurality of member devices including a first member profile corresponding to a first member device, where each member profile contains information about a member related to the member device. The plurality of member profiles can be stored in a server at the establishment or at a remote location. The server does not require being related to a specific establishment.

In operation 710, the networking application 250 receives a new member application related to a second member device not included in the plurality of member profiles. The new member application includes the information to be included in the member profile including, for example, name, address, occupation, family relations, picture, education, other groups or associations, etc.

In operation 715, the networking application 250 determines member attributes of the second member profile based on the received new member application related to the second member device. The member attributes are pulled from the new member application to be used by the networking application 250.

In operation 720, the networking application 250 generates a networking recommendations based on the member attributes, recommendation information, recommendation trigger information, and recommendation target information. The networking application 250 compares the member attribute to past networking recommendations for both the first member device and the plurality of member devices. The networking recommendation can be based on one of: when the recommendation information of a first member device indicates a request for networking recommendations with a specific attribute of the member attributes; when the recommendation information of the first member device indicates accepting networking recommendations of other member profiles with similar member attributes; and when the recommendation target information of the plurality of member profiles with similar member attributes to the first member device have accepted networking recommendations of networking trigger information of other member profiles with similar member attributes.

In operation 725, the networking application 250 transmits the networking recommendation to the first member device. The recommendation can include the member's profile or attribute information, a reason for the recommendation, reviews of past interactions with other members, connections of other members, other ratings that help determine accepting a connection or meeting with the other member.

The networking application 250 receives an indication whether the networking recommendation was accepted. The networking application 250 adjusts recommendation information of the first member profile of the first member device based on whether the networking recommendation was accepted. The recommendation information is localized information specific for each member profile. The recommendation information can include member attributes that the member is requesting or statistics to the acceptance rate of networking recommendations for specific member attributes for the member. The recommendation information includes information on past recommendations and connections to other member profiles. The recommendation information is constantly updated based on new recommendations and connections. The networking application 250 also adjusts recommendation trigger information and recommendation target information for the plurality of member profiles based on whether the networking recommendation was accepted.

The networking trigger information is global information related to when a new member or the second member transmits a new member application to the networking application 250. The networking trigger information includes information on recommendation and connection patterns related to member attributes of a new user. The networking trigger information is used when a new member is accepted to the network group, or when a member device is within a proximity of another member device or enters an establishment.

The networking target information is global information related to the plurality of member devices already associated with the networking application 250, including the first member device. The network target information is used for trends related members receiving recommendations and connections based on member attributes. The network target information is used to direct recommendations and connections based on the receiving member profile attributes.

FIG. 2B illustrates an example links between a first profile and a second profile according to various embodiments of the present disclosure. For example, various components in FIG. 2B could be combined, further subdivided, or omitted and additional components could be added according to particular needs. FIG. 2B does not limit this disclosure to any particular electronic device.

The network application 250 receives recommendation surveys 254, along with logging acceptances, rejects, and no action regarding recommendations, and logging connections made based on the recommendations. The network application 250 creates a heuristic model by analyzing links 280 between a first member profile 260 and a second member profile 270 based on the results of each recommendation, connection, and recommendation survey.

For example, member profile A 260 includes attribute A 261, attribute B 262, attribute C 263, attribute D 264, attribute E 265, and attribute F 266. Member profile B 270 includes attribute A 271, attribute B 272, attribute C 273, attribute D 274, attribute E 275, and attribute F 276. A link 280 between each attributed is adjusted based on the recommendations and connections. Each attribute A-F 261-266 of member profile A 260 is linked with each attribute A-F 271-276 of member profile B.

A recommendation that is accepted or a connection made strengthens or promotes the link 280 between each combination of member attributes between the two member profiles. A recommendation with a connection strengthens or promotes the link 280 a greater amount than either an acceptance of a recommendation or a connection made separately. A recommendation that is not accepted weakens or demotes the link between each combination of member attribute between the two member profiles. In certain embodiments, not accepting a recommendation may not provide any difference to the links themselves, but can demote the member that is not responding to the recommendations.

The links 280 between member attributes can be used in the analysis of generating recommendations. A member profile with attribute that have stronger links is favored for recommendations. In certain embodiments, a member profile can be excluded from recommendation based on links between member attributes that are found to be under a weakness threshold.

The links 280 that involved with more recommendations and connections will adjust the reliability of the link. A first link with a higher ratio of accepted recommendations and connection than second link provides a higher reliability for the first link over the second link. In certain embodiments, a first link with a greater amount of rejected recommendations or bad reviews in the surveys than a second link, but the ratio of rejected recommendations or bad reviews for the first link is less than the ratio of rejected recommendations or bad review for a second link can cause the first link to have a higher reliability than the second link.

The link 280 between a first member profile 260 and a second member profile 270 also determine whether a recommendation is generated. The networking application creates a threshold for the strength of the combination of links 280 between the first profile 260 and the second profile for generating a recommendation. In certain embodiments, a lower threshold can be used to withhold generating a recommendation for the first member profile and the second member profile. As described above, each link 280 can indicate a unique strength and a unique reliability.

The networking application 250 continuously analyzes and updates the trends for the networking trigger information and the networking target information to optimize the efficiency and acceptance of recommendations. Member profiles with a first member attribute can be highly sought after by member profiles with a second member attribute, but not member profiles of a third member attribute. The networking application 250 generates recommendations of the member profiles with the first member attribute to the member profiles of the second member attribute. If the network application 250 determines that member profiles with the second member attribute also have a fourth member attribute that in combination with the second member attribute does not accept recommendations related to the first member attribute, the member profiles with the second member attribute and fourth member attribute are excluded from the recommendations. Also, if the network application 250 determines that member profiles with the third member attribute and a fifth member attribute are accepting the recommendations, the networking application 250 updates the member target information to send recommendations of the first member profile to the member profiles with the third member attribute and the fifth member attribute.

In operation 730, the networking application 250 monitors, when the networking recommendation is accepted, an interaction of the first member device and the second member device. The networking application monitoring the interaction includes monitoring a proximity using location sensors of the first member device and the second member device and a time of the proximity, monitoring biometrics sensed by sensors of the first member device and the second member device, and monitoring members related to the first member device and the second member device of an establishment where the first member device and the second member device are located.

The networking application 250 transmits a recommendation survey to be completed by both the first member device and the second member device. The recommendations survey provides a mean for each member to rate the connection and the recommendation.

In operation 735, the networking application 250 adjusts the recommendation information, the recommendation trigger information, and the recommendation target information based on the monitored interaction and the recommendation survey. Once the recommendation survey is completed and received by the networking application 250, the replies and ratings in the recommendation survey are analyzed to update the recommendations process.

Although FIG. 7 illustrates an example a process 700 for operating a network application, respectively, various changes could be made to FIG. 7. For example, while shown as a series of steps, various steps in each figure could overlap, occur in parallel, occur in a different order, or occur multiple times.

Figure 8:
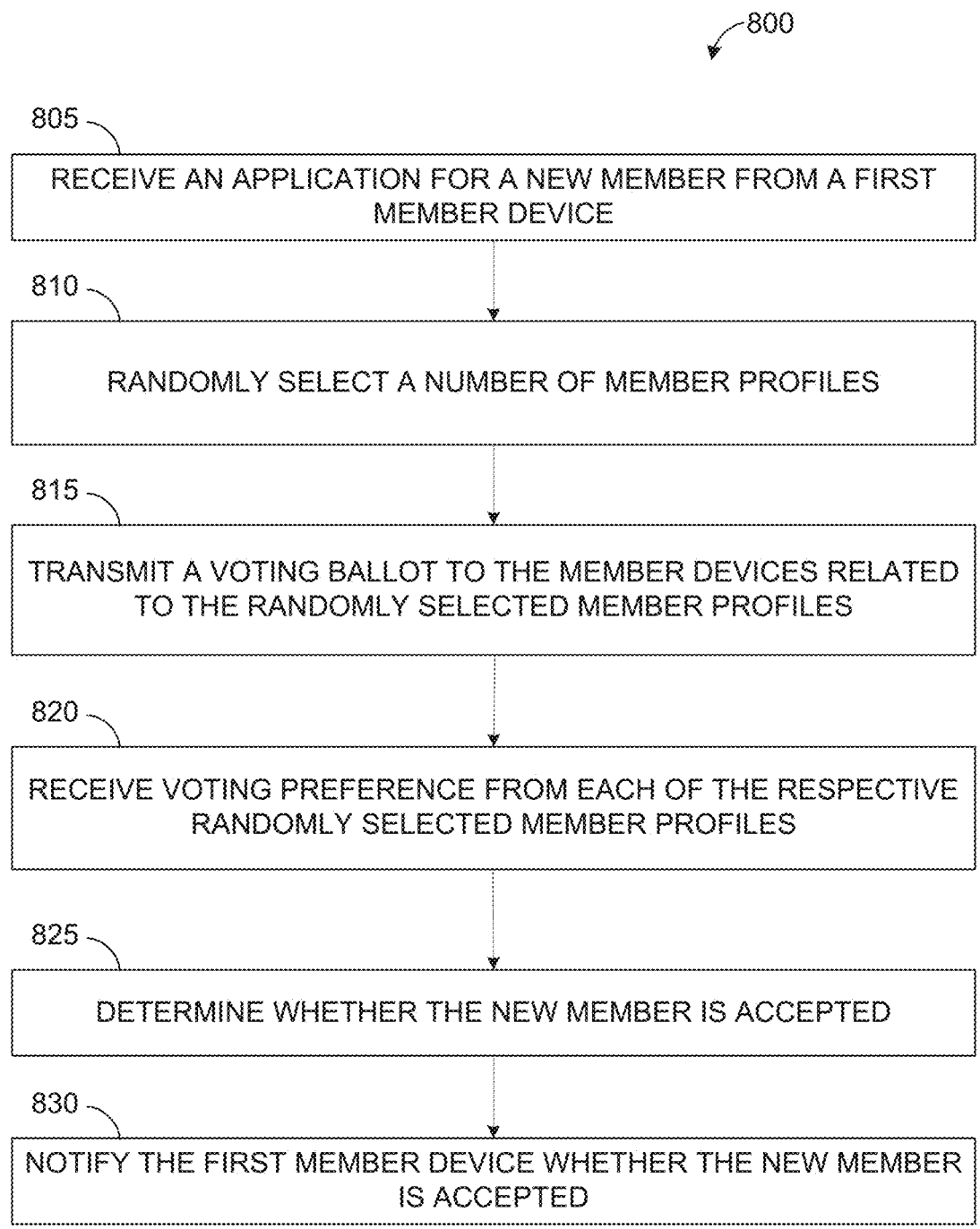
FIG. 8 illustrates a process for voting on a new member in a network application in accordance with various embodiments of the present disclosure.

FIG. 8 illustrates a process for voting on a new member in a network application in accordance with various embodiments of the present disclosure. For example, the process 800 depicted in FIG. 8 may be performed by the establishment server 428 in FIG. 4. The process may also be implemented by server 200 in FIG. 2A or server 104 in FIG. 1. While the process 800 is described as being performed by the networking application 250, the process 800 can also be performed by the establishment application 240.

In operation 805, the networking application 250 receives a new member application for a new member from the first member device. The new member application includes the information to be included in the member profile including, for example, name, address, occupation, family relations, picture, education, other groups or associations, nominating member or members etc.

In operation 810, the networking application 250 randomly selects a predetermined number of member profiles from the plurality of member profiles. The predetermined number can be a number decided by an establishment or networking group for a threshold of members required to admit a new member. The members related to the member profiles can be a random selection of all members or a specific group of member profiles (e.g., a new member board)

In operation 815, the networking application 250 transmits a voting ballot with the new member application to member devices associated with the randomly selected member profiles. The voting ballot can be generated based on a new member application for a new user or a number of new member applications for a group of new users. When the voting ballot can be transmitted based on receiving a specific number of new member applications or a time of the week, month, or year. For example, a voting ballot can be transmitted after receiving ten new member applications, on a specific day of the week (e.g., Monday), a specific day of the month (e.g. the first day of the month), or a specific day of the year (e.g., January 1). The voting ballet can also be transmitted multiple times within each time frame (e.g., semi-weekly, bi-weekly, bi-monthly, semi-annually, etc.).

In operation 820, the networking application 250 receives a voting preference from each of the respective randomly selected member profiles based on the voting ballot from each of the member devices. Voting preferences could include accept, deny, or abstain. A specific voting ballot can require a response in a specified amount of time, including a day, a week, etc. After the specified amount of time, a voting preference can be considered null. A member profile can request to be not be selected as a voting member or denied voting privileges after an amount of voting ballot have not been returned.

In operation 825, the networking application 250 determines whether the new member is accepted based on the received voting preferences. The networking application 250 can determine acceptance of a new member based on a number of accepts, a number of denies, or a combination of both. For example, the network group could decide that seven out of ten members are required for a new member to join. But if the member does not receive the seven votes, the new member can potentially reapply upon meeting enough voting members at a later time. If the network group decides to include a threshold on one deny vote for excluding a member, a new member may be excluded from the network group for that voting ballot, a period of time, or permanently.

In operation 830, the networking application 250 notifies the first member device whether the new member is accepted. If the new member is accepted, the networking application generates a new member profile based on the new member application to be stored in the plurality of member profiles, transmits an acceptance notice of the new member profile to the first member device, and transmits the new member profile to each of the member device in the plurality of member profiles. When the new member is not accepted, the networking application 250 stores the new member profile with rejected applications, and transmits a non-acceptance of the new member profile to the first member device.

Although FIG. 8 illustrates an example a process 800 for voting on a new member in a network application, respectively, various changes could be made to FIG. 8. For example, while shown as a series of steps, various steps in each figure could overlap, occur in parallel, occur in a different order, or occur multiple times.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. An apparatus operating an application for a controlled-access establishment, comprising:
   a Wi-Fi node configured to wirelessly connect to devices in an entryway of the controlled-access establishment;
   a memory configured to store a plurality of member profiles corresponding to a plurality of member devices; and
   a processor coupled to the memory, the processor configured to:
      detect a wireless connection of a device in the entryway of the controlled-access establishment to the Wi-Fi node;
      in response to detecting the wireless connection of the device to the Wi-Fi node, transmit a signal for executing an establishment application for the controlled-access establishment on the wirelessly connected device;
      receive, from the device, an input for verification of a user corresponding to the device in the entryway of the controlled-access establishment captured by the establishment application for the controlled-access establishment executed based on detecting the wireless connection of the device in the entryway to the Wi-Fi node;
      determine whether the user is included in the plurality of member profiles based on the received input for the verification of the user; and
      unlock an entrance in the entryway of the controlled-access establishment in response to determining the user with the device connected to the Wi-Fi node is included in the plurality of member profiles.

2. The apparatus of claim 1, wherein the processor is further configured to:
   detect that the device has left the entryway; and
   lock the entrance in response to detecting that the device has left the entryway.

3. The apparatus of claim 1, wherein the processor is further configured to:
   determine that a second user connected to the Wi-Fi node is not included in the plurality of member profiles; and
   notify, in response to determining the second user is not included in the plurality of member profiles, a management device or staff device that the user not included in the plurality of member profiles is attempting to gain entrance to the controlled-access establishment.

4. The apparatus of claim 1, wherein the processor is further configured to:
   limit control of the entrance based on an amount of members currently in the controlled-access establishment.

5. The apparatus of claim 1, wherein the processor is further configured to:
   review settings for the user of the device included in the plurality of member profiles; and
   perform at least one operation associated with the reviewed settings for the user of the device included in the plurality of member profiles.

6. The apparatus of claim 1, wherein the input for verification becomes available on the establishment application when the device has been detected in the entryway of the controlled-access establishment.

7. The apparatus of claim 1, wherein the processor is further configured to:
   determine that the user is not included in the plurality of member profiles;
   determine that the user is included as a guest of a member in the plurality of member profiles; and
   unlock the entrance in the entryway of the controlled-access establishment in response to determining the user is the guest of the member.

8. A method for an apparatus operating an application for a controlled-access establishment, comprising:
   storing a plurality of member profiles corresponding to a plurality of member devices;
   detecting a wireless connection of a device in an entryway of the controlled-access establishment to a Wi-Fi node that wirelessly connects to devices in the entryway of the controlled-access establishment;
   in response to detecting the wireless connection of the device to the Wi-Fi node, transmitting a signal for executing an establishment application for the controlled-access establishment on the wirelessly connected device;
   receiving, from the device, an input for verification of a user corresponding to the device in the entryway of the controlled-access establishment captured by the establishment application for the controlled-access establishment executed based on detecting the wireless connection of the device in the entryway to the Wi-Fi node;
   determining whether the user is included in the plurality of member profiles based on the received input for the verification of the user; and
   unlocking an entrance in the entryway of the controlled-access establishment in response to determining the user with the device connected to the Wi-Fi node is included in the plurality of member profiles.

9. The method of claim 8, further comprising:
   detecting that the device has left the entryway; and
   locking the entrance in response to detecting that the device has left the entryway.

10. The method of claim 8, further comprising:
    determining that a second user connected to the Wi-Fi node is not included in the plurality of member profiles; and
    notifying, in response to determining the second user is not included in the plurality of member profiles, a management device or staff device that the user not included in the plurality of member profiles is attempting to gain entrance to the controlled-access establishment.

11. The method of claim 8, further comprising:
    limiting control of the entrance based on an amount of members currently in the controlled-access establishment.

12. The method of claim 8, further comprising:
reviewing settings for the user of the device included in the plurality of member profiles; and
performing at least one operation associated with the reviewed settings for the user of the device included in the plurality of member profiles.

13. The method of claim 8, wherein the input for verification becomes available on the establishment application when the device has been detected in the entryway of the controlled-access establishment.

14. The method of claim 8, further comprising:
determining that the user is not included in the plurality of member profiles;
determining that the user is included as a guest of a member in the plurality of member profiles; and
unlocking the entrance in the entryway of the controlled-access establishment in response to determining the user is the guest of the member.

15. A non-transitory computer readable medium for operating an application for a controlled-access establishment, comprising instructions stored thereon, that when executed cause a processor to:
detect, by the application of the controlled-access establishment, a wireless connection of a device in an entryway of the controlled-access establishment to a Wi-Fi node that wirelessly connects to devices in the entryway of the controlled-access establishment;
in response to detecting the wireless connection of the device to the Wi-Fi node, transmit a signal for executing an establishment application for the controlled-access establishment on the wirelessly connected device;
receive, from the device, an input for verification of a user corresponding to the device in the entryway of the controlled-access establishment captured by the establishment application for the controlled-access establishment executed based on detecting the wireless connection of the device in the entryway to the Wi-Fi node;
determine whether the user is included in a plurality of member profiles based on the received input for the verification of the use; and
unlock an entrance in the entryway of the controlled-access establishment in response to determining the user with the device connected to the Wi-Fi node is included in the plurality of member profiles.

16. The non-transitory computer readable medium of claim 15, wherein the instructions further cause the processor to:
detect that the device has left the entryway; and
lock the entrance in response to detecting that the device has left the entryway.

17. The non-transitory computer readable medium of claim 15, wherein the instructions further cause the processor to:
determine that a second user connected to the Wi-Fi node is not included in the plurality of member profiles; and
notify, in response to determining the second user is not included in the plurality of member profiles, a management device or staff device that the user not included in the plurality of member profiles is attempting to gain entrance to the controlled-access establishment.

18. The non-transitory computer readable medium of claim 15, wherein the instructions further cause the processor to:
limit control of the entrance based on an amount of members currently in the controlled-access establishment.

19. The non-transitory computer readable medium of claim 15, wherein the instructions further cause the processor to:
review settings for the user of the device included in the plurality of member profiles; and
perform at least one operation associated with the reviewed settings for the user of the device included in the plurality of member profiles.

20. The non-transitory computer readable medium of claim 15, wherein the input for verification becomes available on the establishment application when the device has been detected in the entryway of the controlled-access establishment.

21. The non-transitory computer readable medium of claim 15, wherein the instructions further cause the processor to:
determine that the user is not included in the plurality of member profiles;
determine that the user is included as a guest of a member in the plurality of member profiles; and
unlock the entrance in the entryway of the controlled-access establishment in response to determining the user is the guest of the member.

* * * * *